United States Patent [19]
Gurtler

[11] 3,933,143
[45] Jan. 20, 1976

[54] COMBUSTION CHAMBER PROTECTION MEANS

[75] Inventor: Rudolf Gürtler, Endersbach, Germany

[73] Assignee: Mahle GmbH, Stuttgart, Germany

[22] Filed: May 28, 1974

[21] Appl. No.: 473,685

[30] Foreign Application Priority Data
May 30, 1973 Germany............................ 2327551

[52] U.S. Cl.............................. 123/193 P; 123/32 B
[51] Int. Cl.$^2$............................................ F02F 3/28
[58] Field of Search... 29/156.5 R; 123/32 B, 193 P, 123/193 CP; 92/172, 208

[56] References Cited
UNITED STATES PATENTS
3,251,349  5/1966  Isley ........................... 123/193 P X
3,508,531  4/1970  Squinto et al. .................. 123/193 P
3,807,014  4/1974  Hummel ...................... 123/193 P X FOREIGN PATENTS OR APPLICATIONS
1,272,620  7/1968  Germany............................ 123/1 R
1,122,325  1/1962  Germany........................... 123/32 B
1,526,322  2/1970  Germany........................... 123/32 B Primary Examiner—Charles J. Myhre
Assistant Examiner—William Anderson
Attorney, Agent, or Firm—William Anthony Drucker

[57] ABSTRACT

A combustion engine with a piston forming the combustion chamber, means for protecting the edge of the opening of the combustion chamber against cracks being arranged so that they only take effect in the peripheral zones of the edge which are adjacent the supporting sides of the piston.

8 Claims, 5 Drawing Figures

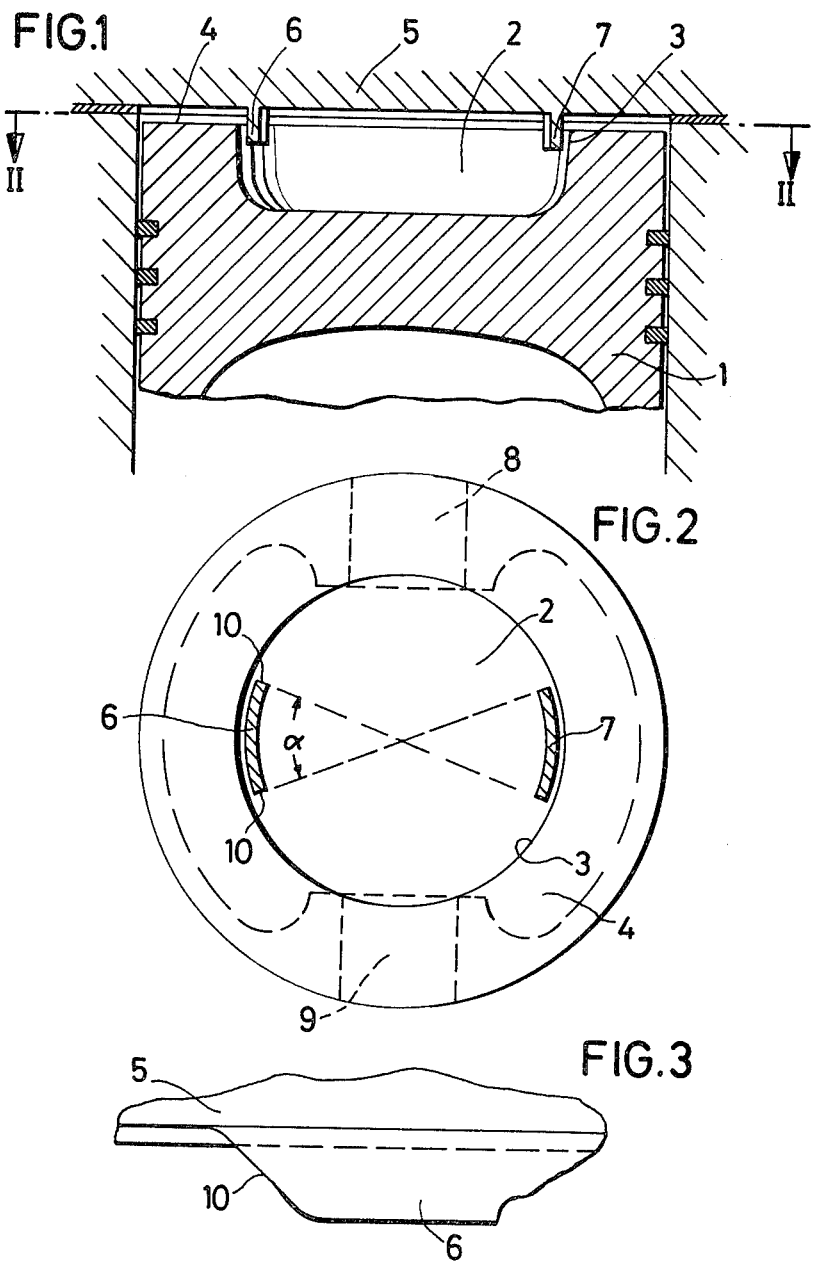

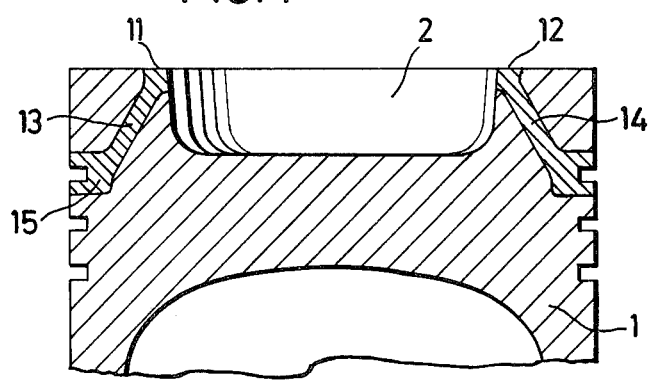
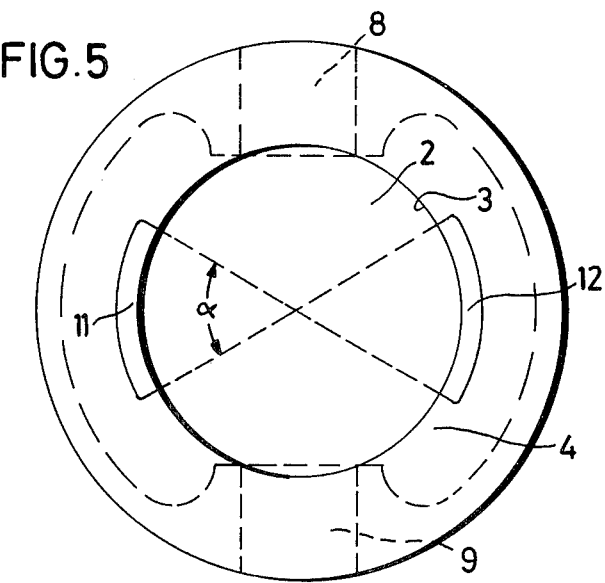

COMBUSTION CHAMBER PROTECTION MEANS

BACKGROUND OF THE INVENTION

1. Field of the Invention

This invention relates to a combustion engine of which the pistons are provided with a combustion chamber and which comprise means for protecting the edge of the opening of the combustion chamber from the formation of cracks.

2. Description of the Prior Art

German Pat. No.: 745,396 describes a method of protecting the edge of the mouth, in the case of pistons subjected to a considerable loading, by constructing the said edge of a material of higher thermal resistance than that of the piston itself. Although the edge of the mouth can be thus effectively protected against the formation of cracks due to the high and continually changing incidence of the temperature, this method nevertheless increases the weight of the piston. Constructions are therefore known in which heavy metal inserts of the aforementioned type are dispensed with. In German Specification No: 1,122,325 for example, the edge of the opening is protected by a pure aluminium layer applied by the building-up welding process, while German Specification No: 2,124,595 describes a method of refining a light-metal piston, in the zone of the said edge, by re-melting it with a charge-carrier ray, thus rendering it resistant to cracks. This otherwise very useful solution, however, suffers from the drawback of the considerable production cost involved.

SUMMARY OF THE INVENTION

The object of this invention is to provide effective and simple means for protecting the edge of the opening of the combustion chamber of pistons, without thereby increasing the weight of these latter appreciably, if at all.

The solution to this problem is based on the realization that the stresses to which the edge of the mouth of the combustion chamber are subjected through mechanical and thermal factors interact in such a way that it is loaded to a widely varying extent over its periphery. This phenomenon can be explained as follows: in respect of the axis of the piston pin the piston has a lower moment of resistance to flexure than in respect of an axis perpendicular to the axis of the piston pin and to the longitudinal axis of the piston, as the hubs of the piston pin, and the piston pin mounted thereon, provide the piston head with considerable stiffening. The mechanical forces thus tend to bend the piston about the piston pin, as a result of which tensile stresses occur in the zones of the edge of the mouth which are adjacent to the piston pin hubs, while compressive stresses occur in the zones thereof which are adjacent to the supporting sides. Unlike these mechanical stresses, the thermal stresses have the same sign and approximately the same magnitude over the entire periphery of the mouth of the edge. As the material of which the piston pin is made, and which also forms the mouth of the edge, tends to expand towards the middle of the piston pin when subjected to a temperature rise, these thermal voltages subject the edge of the mouth to pressure.

When the piston is in operation the mechanical and the thermal stresses become superimposed on one another, i. e. they largely balance one another out in the zones of the edge of the mouth but become added together in the peripheral zones adjacent to the supporting sides.

According to the invention, the means for the protection of the edge of the mouth of the combustion chamber against the formation of cracks are arranged in such a way that they only take effect in the peripheral zones adjacent to the supporting sides.

According to the invention, the means for the protection of the edge of the mouth of the combustion chamber against the formation of cracks are arranged in such a way that they only take effect in the peripheral zones of the said edge which are adjacent to the supporting sides of the piston.

The solution adopted in the invention represents a departure from the measures hitherto known, in which importance was attached to protection for the entire edge of the mouth. It is however, precisely because the means intended for the protection of the edge of the mouth are no longer extended to the zones adjacent to the hubs of the piston pin that the cracking of the said edge is very efficiently prevented: the system ensures that the mechanical and thermal stresses, operating in opposition to one another, can interact without obstacle in the peripheral zones of the edge of the mouth which are adjacent to the hubs of the piston pin, in such a way as to balance one another out, whereas the remaining peripheral zones, in which the mechanical stresses likewise act as a compressive stress, are relieved of thermal stress. This ensures that the entire edge of the mouth is only subjected to very moderate stresses, which are evenly distributed.

Special advantages are offered by a version of the invention in which the means for the protection of the edge of the mouth are formed by covering screens which stand out from the cylinder head in such a way that when the piston occupies the upper dead centre position they extend into the combustion chamber, taking a parallel or approximately parallel course to the said edge, and at a slight distance therefrom, in the process. A further example of existing prior art, to which attention should be drawn in this connection, if provided by Ger.Fin.Discl. 1,272,620 from which a combustion engine with direction injection is known, direct impact of the jets of fuel on the wall of the combustion chamber provided in the piston being prevented by similar covering screens projecting into it. Their number, arrangement and size are thus governed by the nature of the fuel injection, while in the combustion engine of the present invention the essential point is that the said screens only take effect in the peripheral zones of the edge of the mouth which are adjacent to the supporting sides of the piston. As the greater part of the quantity of heat released by the combustion is converted shortly after the piston has reached its upper dead centre position, it is in general sufficient for the covering screens, in this position, to extend by two to three millimeters into the combustion chamber.

It has also been found that it is sufficient for the screens to extend over peripheral zones corresponding to an angle of 90° at the most. An angle of 30° - 60° appears particularly suitable.

It is obvious that this version of the invention enables any increase in the weight of the piston to be avoided.

In another version of the invention the means for the protection of the edge of the mouth of the combustion chamber consist of curved inserts forming part of the said edge and made of a material of greater thermal resistance than that of the piston itself and firmly secured in a manner known per se in the said material of the piston. This solution likewise offers advantages from the point of view of weight, by comparison with the known designs with closed annular inserts.

BRIEF DESCRIPTION OF THE DRAWING

FIG. 1 shows a longitudinal section through part of the cylinder head and of the piston belonging to the combustion engine of the invention and occupying its upper dead centre position;

FIG. 2 shows a section along the line II—II of FIG. 1.,

FIG. 3 shows a view, on a larger scale, of the edge of a covering screen shown in FIGS. 1 and 2, FIG. 4 shows a longitudinal section through another version of the invention, and FIG. 5 shows a top view of the piston shown in FIG. 4.

DESCRIPTION OF THE PREFERRED EMBODIMENTS

The light metal piston 1, occupying its upper dead centre position, is provided with a central cylindrical combustion chamber 2 of which the edge 3 of the mouth forms the transition to the piston head 4. The cylinder head 5 has two covering screens 6 and 7 projecting from it in an axial direction. They extend into the combustion chamber 2, taking a course parallel to the edge 3 of the mouth, and at a slight distance therefrom, thus covering part of the said edge, so that it is protected from the direct action of the combustion gases. The covering screens 6 and 7 are only situated in those peripheral zones which are adjacent to the supporting sides of the piston 1 and extend in the peripheral direction over a zone corresponding to an angle $\alpha$ of 40° from the central point. The other zones, adjacent to the hubs 8 and 9 of the piston pin, are without the covering screens 6 and 7. The lateral ends 10 of the said screens 6 and 7 continue gradually and obliquely, as may be seen from FIG. 3, into the plane of the cylinder head 5, so that no excessive local temperature gradients, which would lead to harmful stress peaks, occur in this zone.

FIGS. 4 and 5 show an alternative version of the invention. The edge 3 of the mouth of the combustion chamber 2 in the piston 1 is in this case formed, in the zone adjacent to the supporting sides, by curved inserts 11 and 12 which are made of an iron-nickel alloy of high thermal resistance and which, in a manner known per se, and via stays 13 and 14, are connected with an annular support 15, thus being firmly secured in the material of the piston. In the peripheral direction the curved inserts 11 and 12 in this case extend over a range corresponding to an angle $\alpha$ of 60° from the central point. The remaining zone is not in contact with the inserts, so that in this position the mechanical tensile stresses and the thermal compressive stresses can largely balance one another out.

I claim:

1. In a combustion engine of which the pistons are provided with a combustion chamber, the provision of means for protecting the edge of the mouth of the opening of the combustion chamber from the formation of cracks, said protecting means being arranged in the two peripheral zones of said edge adjacent the supporting sides of the piston and extending over an angle of not more than 90° over the central point of each supporting side.

2. Combustion engine according to claim 1, in which the angle over which the protecting means extends is from 30–60°.

3. Combustion engine in accordance with claim 1, in which the protection means consist of curved inserts which form part of the edge of the mouth and which are made of a material of higher thermal resistance than that of the piston itself and which are firmly secured in the material of the piston.

4. Combustion engine according to claim 1 in which the protecting means are in the form of covering screens which extend away from the cylinder head in such a way that when the piston occupies the upper dead centre position they enter the combustion chamber, taking a substantially parallel course to the edge of the mouth, and at a slight distance therefrom.

5. Combustion engine according to claim 4, in which the two lateral sides of a covering screen are concave at the juncture of the screen and the cylinder head.

6. Combustion engine according to claim 4, in which the two laterial sides of a covering screen are obliquely disposed.

7. Combustion engine according to claim 4, in which the covering screens, when the piston occupies its upper dead centre position, extend into the combustion chamber by not more than 5mm.

8. Combustion engine according to claim 4, in which the covering screens extend into the combustion chamber by from 2–3 mm.

* * * * *